United States Patent
Kobayashi et al.

(10) Patent No.: US 9,475,213 B2
(45) Date of Patent: Oct. 25, 2016

(54) METHOD FOR REPRODUCING TEMPLATE AND REPRODUCING APPARATUS

(75) Inventors: Masako Kobayashi, Kanagawa-ken (JP); Hideaki Hirabayashi, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 130 days.

(21) Appl. No.: 13/606,199

(22) Filed: Sep. 7, 2012

(65) Prior Publication Data

US 2013/0233829 A1    Sep. 12, 2013

(30) Foreign Application Priority Data

Sep. 22, 2011  (JP) ................ 2011-207821

(51) Int. Cl.
- *C03C 15/00* (2006.01)
- *B29C 33/38* (2006.01)
- *B29C 33/58* (2006.01)

(52) U.S. Cl.
CPC .......... *B29C 33/3842* (2013.01); *B29C 33/58* (2013.01)

(58) Field of Classification Search
None
See application file for complete search history.

(56) References Cited

U.S. PATENT DOCUMENTS 3,959,172 A * 5/1976 Brownell ............... G21F 9/24
                                                        405/129.25
8,597,527 B2 * 12/2013 Taniguchi ............ G11B 5/855
                                                        216/22

2009/0078673 A1 * 3/2009 Kihara ................. B82Y 10/00
                                                        216/11
2011/0146568 A1 * 6/2011 Haukka ............ C23C 16/45555
                                                        118/200
2013/0200553 A1    8/2013 Yamada et al.

FOREIGN PATENT DOCUMENTS

| JP | 2000-158533 A  | 6/2000  |
|----|----------------|---------|
| JP | 2010-184485    | 8/2010  |
| JP | 2010-244032 A  | 10/2010 |
| JP | 2011-806 A     | 1/2011  |
| JP | 2011-9362 A    | 1/2011  |
| TW | 201100240 A *  | 1/2011  |
| TW | 201100240 A1   | 1/2011  |
| WO | WO 2012/056911 A1 | 5/2012 |

OTHER PUBLICATIONS

UCCT, Silane Coupling Agents Guide, Sep. 7, 2014, p. 1-12.*
Power Chemical, Silane Coupling Agents Guide, 2009, Power Chemical, p. 1-7.*
Derwent, 2008-H12265, 2008, Thompson Reuters, Abstract.*

(Continued)

*Primary Examiner* — Binh X Tran
*Assistant Examiner* — David Cathey, Jr.
(74) *Attorney, Agent, or Firm* — Oblon, McClelland, Maier & Neustadt, L.L.P.

(57) ABSTRACT

An aspect of the present disclosure, there is provided a method for reproducing a template. The template includes a transfer surface and a release layer. The transfer surface has a concavoconvex pattern. The release layer includes an inorganic functional group and an organic functional group, both being bonded to the transfer surface. The method for reproducing the template includes the following two steps: removing the organic functional group by oxidizing and decomposing the organic functional group included in the release layer; and removing the inorganic functional group; and forming the release layer by coupling a silane coupling agent with the transfer surface.

5 Claims, 7 Drawing Sheets

(56) References Cited

OTHER PUBLICATIONS

Combined Chinese Office Action and Search Report issued Mar. 27, 2014, in Chinese Patent Application No. 201210347807.3 with English translation and with English translation of category of cited documents.

Combined Taiwanese Office Action and Search Report issued May 2, 2014 in Patent Application No. 101132403.

Office Action issued on Nov. 21, 2014 in the corresponding Japanese Patent Application No. 2011-207821 (with English Translation).

Office Action issued Mar. 13, 2015 in Japanese Patent Application No. 2011-207821 (with English language translation).

* cited by examiner

METHOD FOR REPRODUCING TEMPLATE AND REPRODUCING APPARATUS

CROSS REFERENCE TO RELATED APPLICATION

This application is based upon and claims the benefit of priority from prior Japanese Patent Application No. 2011-207821, filed on Sep. 22, 2011, the entire contents of which are incorporated herein by reference.

FIELD

Embodiments of the present disclosure relate basically to a method for reproducing a template and a reproducing apparatus thereof.

BACKGROUND

In recent years, a technique that applies a nanoimprint to patterning of resist on a semiconductor has been developed. Nanoimprint lithography (NIL) presses a template with a concavoconvex pattern onto a substrate coated with resist, cures the resist, and subsequently releases the template from the substrate, thereby forming a fine pattern.

A background art is disclosed, which forms a release layer on the surface of a template to easily release the template from a cured resist.

Unfortunately, the background art has needed a replacement of the template, because the template possibly deteriorates during repetitive imprinting. Thus, a novel technology to enhance the durability of templates is needed.

DETAILED DESCRIPTION

According to an aspect of the present disclosure, a method for reproducing a template is provided. The template includes a transfer surface and a release layer. The transfer surface has a concavoconvex pattern. The release layer includes an inorganic functional group and an organic functional group, both being bonded to the transfer surface. The method for reproducing the template includes the following two steps: removing the organic functional group by oxidizing and decomposing the organic functional group included in the release layer; and removing the inorganic functional group; and forming the release layer by coupling a silane coupling agent with the transfer surface.

Further, according to another aspect of the present disclosure, a reproducing apparatus for reproducing the template is provided. The reproducing apparatus includes a first processing section for removing the organic functional group of the release layer by oxidizing and decomposing; a second processing section for removing the inorganic functional group of the release layer; and a third processing section for forming the release layer by coupling a silane coupling agent with the transfer surface.

Embodiments of the present disclosure will be described in detail with reference to the drawings below.

(First Embodiment)

Figure 1:
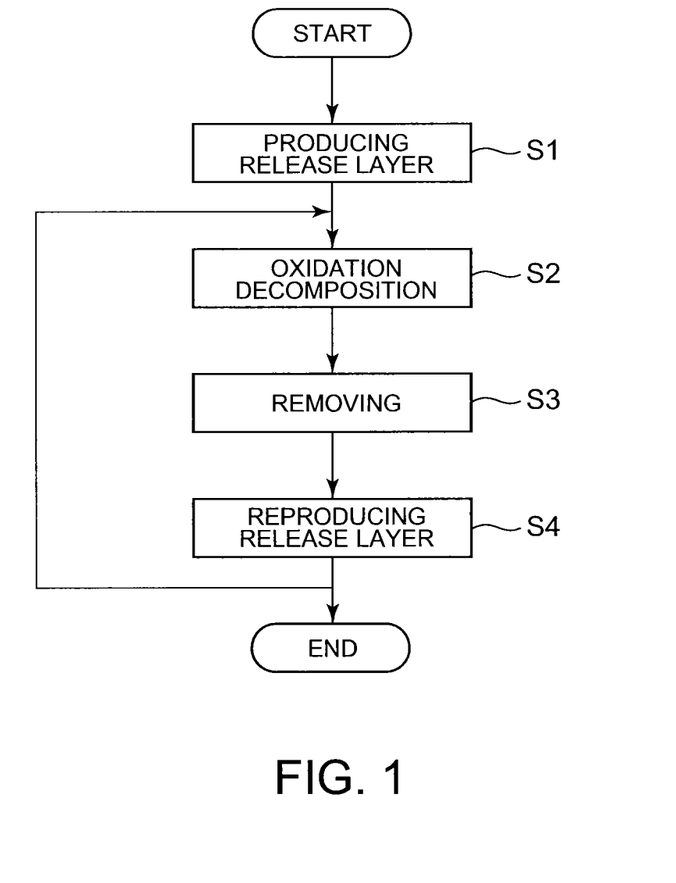
FIG. 1 is a flow chart to exemplify a method for reproducing a template according to a first embodiment.

FIG. 1 is a flow chart to exemplify a method for reproducing a template according to a first embodiment.

At Step S1, a release layer is formed on the surface of a template.

Materials of the template include quartz glass when light curing resist is employed. Methods for forming a release layer include a method using a silane coupling agent. The silane coupling agent is denoted by a chemical formula of $R_n$—Si—$X_{4-n}$. Examples of R include an alkyl group and a fluoro group. Examples of X include an alkoxy group, an acetoxy group, and halogen atoms.

Figure 2:
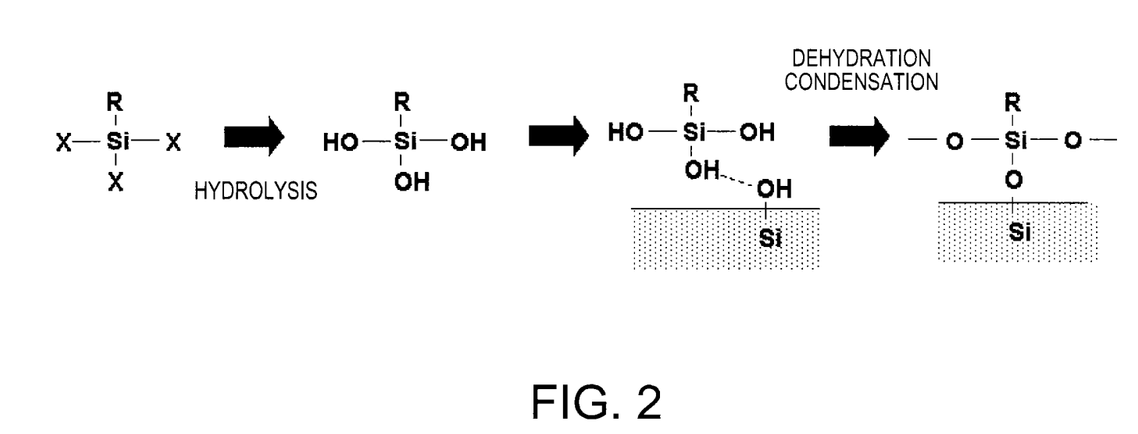
FIG. 2 is an example showing a forming process of a release layer for a template.

FIG. 2 is an example showing a forming process of a release layer for a template. The functional group X of a silane coupling agent reacts hydrolytically with moisture in air to produce a silanol group (Si—OH). A dehydration synthesis reaction causes the silanol group and another silanol group on the surface of the silica template to bind chemically to each other. As a result, the dehydration synthesis reaction forms Si—O—Si bonding to prepare a release layer on the surface of the template. Meanwhile, the functional group R gives a release property.

In addition, the template can be cleaned by ultraviolet irradiation, thereby allowing it to uniformly provide a silanol group onto the surface of the template.

The silane coupling agent is fed in a liquid phase or a gaseous phase. The liquid agent is prepared by diluting the agent with organic solvent to feed the liquid agent on the surface of the silica template. After the feeding, rinsing and baking could be done for removing unreacted residues and for enhancing the reaction, respectively. Before the silane coupling agent reacts with the substrate, the substrate is cleaned to uniformly enhance the reaction.

Alternatively, amine compounds denoted by $R_3$—Si—NH—Si—$R'_3$, $R_3$—Si—$NR'_2$ may be used as well as the silane coupling agent.

At Step S1, forming the release layer is followed by imprinting with the template.

The release layer on the surface of the template breaks little by little during repetitive imprinting to deteriorate release force of the template from the resist. Hence, a reproducing process including the following Steps S2 to S3 is conducted.

At Step S2, the organic functional group of the release layer formed on the surface of the template is oxidized and decomposed. Methods of the oxidation decomposition include ultraviolet irradiation, plasma exposure, and chemical-solution treatment. The oxidation decomposition oxidizes and decomposes the organic functional group R of the silane coupling agent to expose Si—O bonding onto the surface of the template. The organic functional group on the surface of the template could change into a silanol group by reacting moisture in air.

At Step S3, inorganic functional groups of the release layer formed on the template are removed with a chemical solution. Specifically, the Si—O bonding of the silane coupling agent left at Step S2 is removed from the surface of the template with the chemical solution. Examples of the chemical solution include alkali solutions containing ammonia, choline, or sodium hydrate; and acid solutions containing hydrogen fluoride. The reaction to dissolve the Si—O bonding left on the surface of the template is denoted by the reaction formula $SiO_2+OH^-\rightarrow HSiO_3^-$. It is preferable to conduct etching by more than 0.15 nm for removing the inorganic functional group of the release layer.

The above-described Steps S2 and S3 have removed the release layer on the surface of the template. At Step S4, a new release layer is formed again on the surface of the template. The specific processing at Step S4 is the same as that at Step S1. Step S4 prepares a new release layer to enable it to recover the release force of the template when released from the resist in imprinting.

Steps S2 to S4 for reproducing templates are conducted by determining that the release layer has deteriorated, e.g., when the incidence rate of defects in manufactured semiconductor products increases; or the release force decreases. The incidence rate of defects included in manufactured semiconductor products are evaluated, e.g., by counting the number of defective products in the inspection process of patterns on a wafer. It is determined that the release force of the template has deteriorated when the incidence rate of defects exceeds a constant value. Alternatively, it may be determined that the release force of the template has deteriorated when the release force for imprinting, which is normally measured in an imprinting apparatus, decreases.

Examples obtained with a comparative method and the present embodiment will be described. Numerical values or materials specified below are absolutely included in one example. Thus, the embodiment is not limited to the values or the materials.

Figure 3:
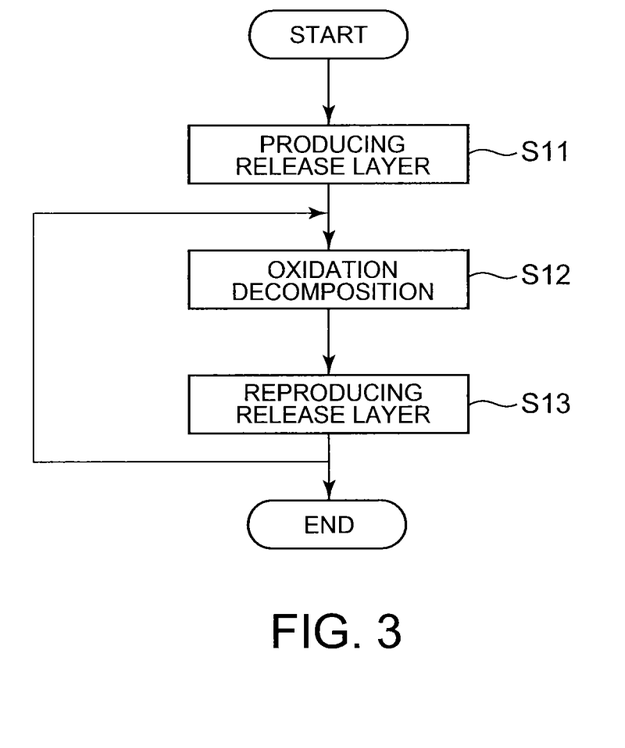
FIG. 3 is a flow chart to exemplify a method for reproducing a template in accordance with the comparative method.

FIG. 3 is a flow chart to exemplify a method for reproducing a template in accordance with the comparative method. Steps S11, S12, and S13 in the comparative method are the same as S1, S2, and S3 in the present embodiment shown in FIG. 1. The comparative method differs from the present embodiment in that the comparative method omits Step S3 of the present embodiment shown in FIG. 1.

An experimental example obtained with the comparative method will be described.

A thermally-oxidized film is used for a template. The thermally-oxidized film formed on a Si wafer is used as a substrate, and is 52 nm in thickness. Hexamethyldisilazane (HMDS) is used for a material of a release layer. A cleaned substrate is exposed to HMDS in air so that a release layer is prepared on the surface of the substrate. Subsequently, the resultant substrate is irradiated with ultraviolet ($\lambda$=172 nm) so that the release layer is oxidized and decomposed.

Repeating the above-mentioned procedure eleven times is followed by measuring the film thickness of the Si oxide film with an ellipsometer. The measuring has revealed that the film thickness increases by 1.92 nm; i.e., by an increment of 0.17 nm per one cycle for the formation and oxidation decomposition of the release layer. The increment corresponds to a thickness of a mono layer of molecules, suggesting that each repetitive set of formation and oxidation decomposition of the release layer forms a Si oxide film on the surface of the substrate. Oxidation decomposition such as plasma or ultraviolet irradiation decomposes the organic functional group R of the silane coupling agent, but does not remove the Si—O bonding that is bonded directly to the substrate, suggesting that repeating the formation and oxidation decomposition of the release layer surely forms a Si oxide film on the surface of the substrate.

The above experimental result has revealed that reproducing a template by the comparative method sequentially forms Si oxide films on the surface of the substrate. Repeating the steps of the comparative method probably changes a dimension of the template. Even such a dimension change of several nm could affect microfabricated semiconductor products. Thus, a novel method and novel apparatus are needed to reproduce a template without the dimension change therein.

An experimental result of the present embodiment shown in FIG. 1 will be described below.

Steps S1, S2, and S3 included in the present embodiment shown in FIG. 1 are conducted as well as in the comparative method described above. Removing the inorganic functional group at Step S3 is conducted by removing extra Si oxide films with chemical solution. The extra Si oxide films are added by formation and oxidation decomposition of the release layer. Specifically, the extra Si oxide films are removed by immersing the Si substrate having the extra Si oxide films formed in the experiment of the comparative method. In accordance with the experimental results of the above-described comparative method, etching by at least 0.17 nm or more than 0.15 nm is preferred. Compound liquid of choline and hydrogen peroxide is diluted with water for the chemical solution.

Figure 4:
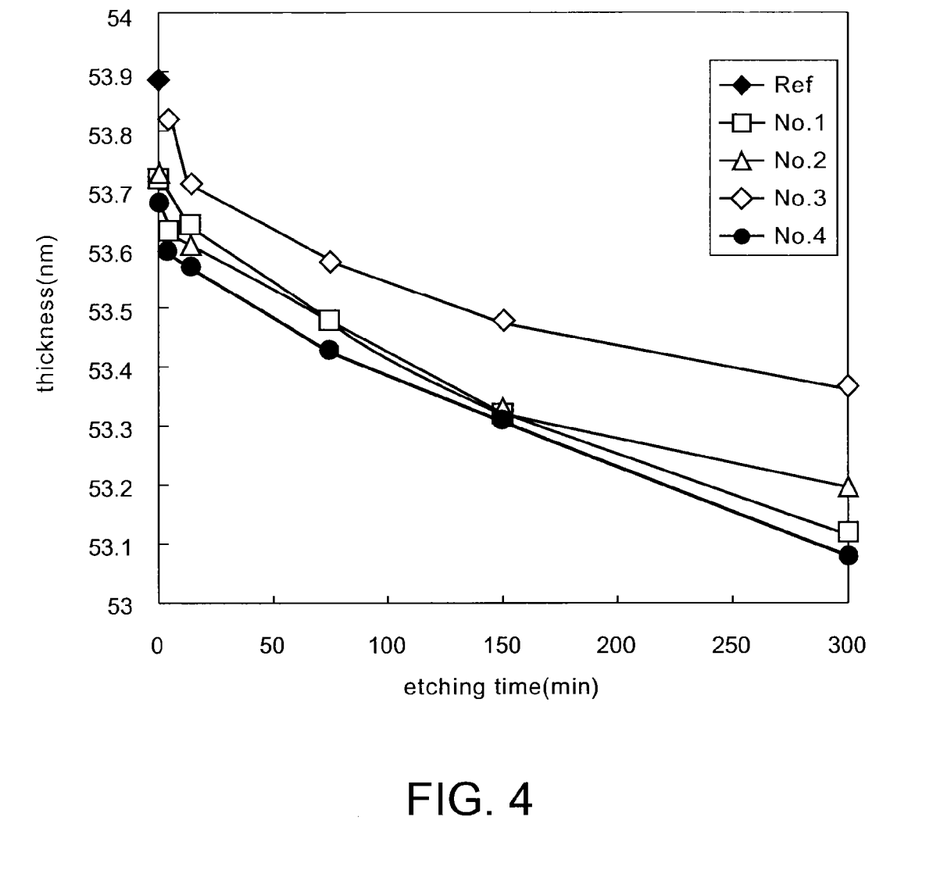
FIG. 4 is a graph showing measurements of the film thicknesses of Si oxide films prepared by a method of a second embodiment.

FIG. 4 is a graph showing measurements of the film thicknesses of Si oxide films prepared by the method of the present embodiment. Changes in the film thicknesses with immersion time are measured using an ellipsometer when the substrate is immersed in the chemical solution.

The graph of FIG. 4 shows that the film thickness of the Si oxide film decreases with the immersion time, suggesting that removing an inorganic functional group of the release layer at Step S3 of the present embodiment allows it to prepare a new release layer and remove the deteriorated Si oxide films by oxidation and decomposition.

Every time the processing due to the reproducing method of the present embodiment is conducted, the processing removes a Si oxide film formed by formation and oxidation decomposition of the release layer, thereby preventing a change in the dimension of the template. When the change causes a dimensional discrepancy between the template and its resist pattern, the template must be replaced with a new one. The method of the present embodiment, which prevents the change in the dimension of the template, reduces a replacement frequency of the template, i.e., enhances the durability of the template.

In addition, the method of the present embodiment, which prevents the change in the dimension of the template, enables it to form a resist pattern more precisely than the comparative method. Thus, the number of semiconductor elements that can be imprinted with a template increases, thereby requiring the relatively small number of templates to reduce the production cost of semiconductor products. The effect of reducing the production cost becomes conspicuous when expensive silica glass is used for templates.

The method for reproducing a template in accordance with the present embodiment is conducted by the oxidation decomposition of an organic functional group of a release layer formed with a silane coupling agent, which is followed by the removal of an inorganic functional group of the release layer. The method enables it to prevent a change in the dimension of the template every time the template is reproduced. In other words, the method enables the continued use of a template, i.e., enhances the durability of the template.

(Second Embodiment)

Figure 5:
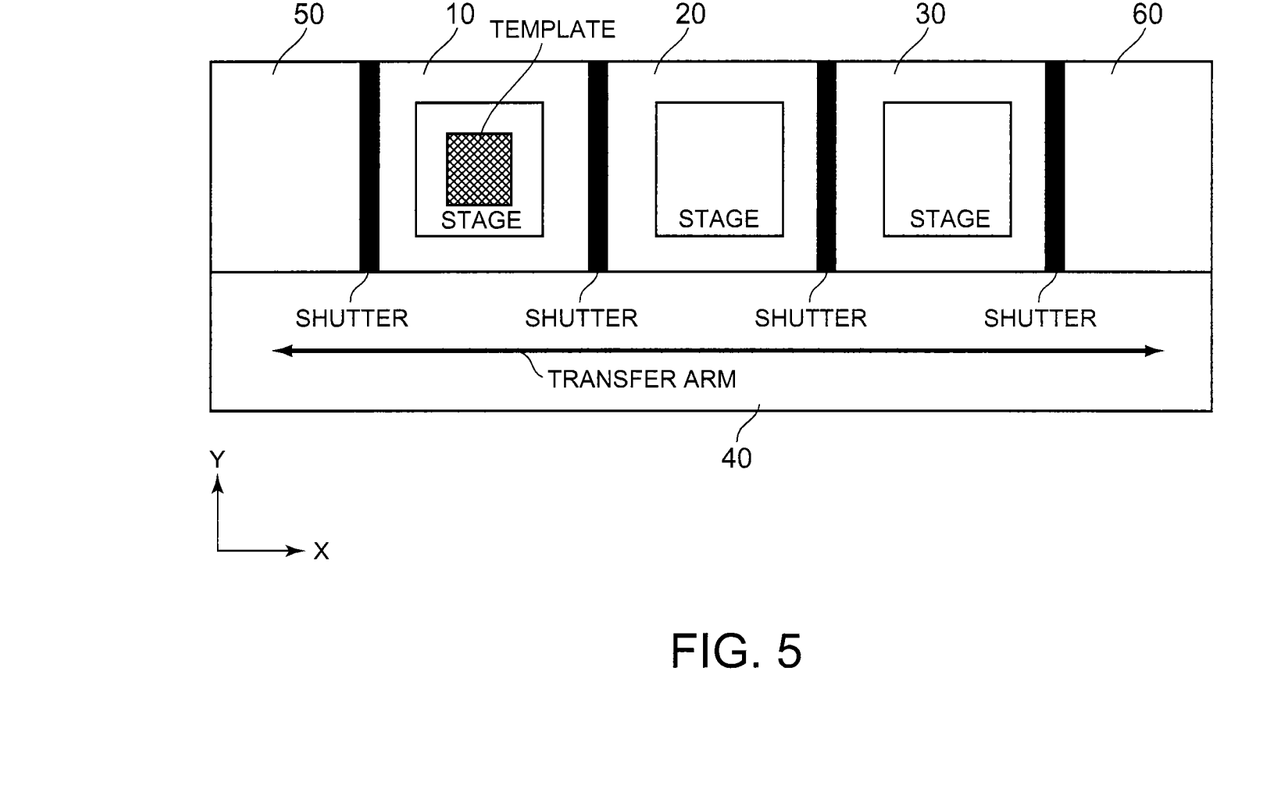
FIG. 5 is a top view showing a reproducing apparatus in accordance with the second embodiment.
Figure 6:
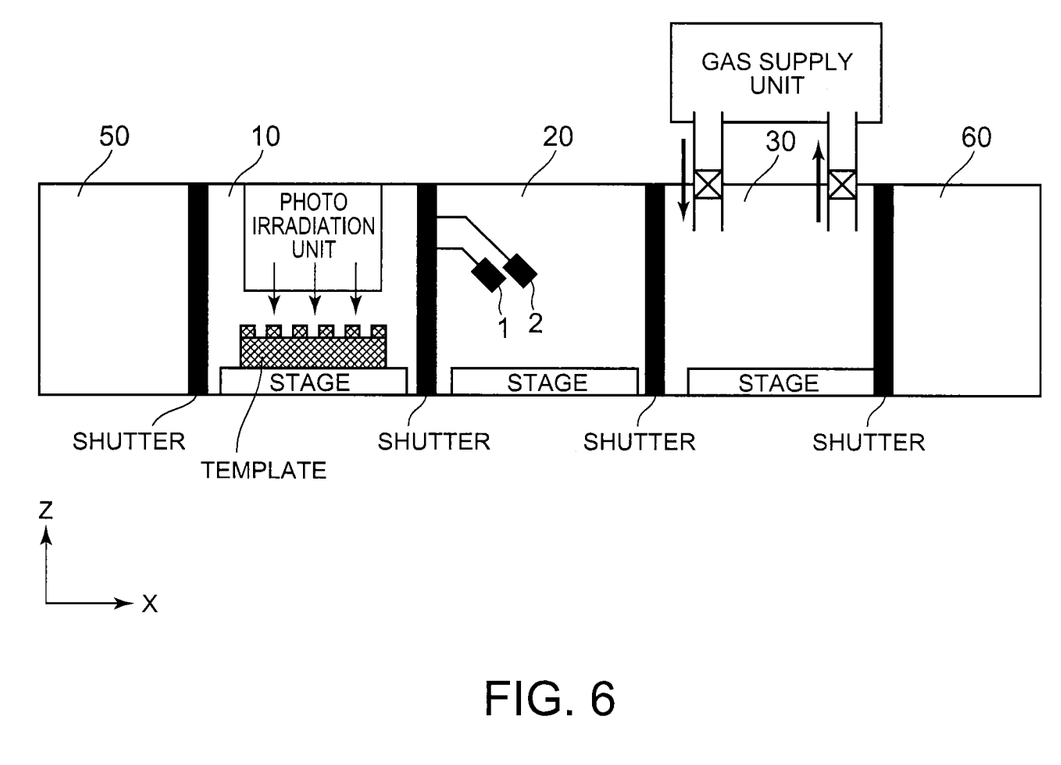
FIG. 6 is a sectional view showing the reproducing apparatus in accordance with the second embodiment.

A reproducing apparatus of a template in accordance with a second embodiment will be described below. The reproducing apparatus is to reproduce the template using the method described in the first embodiment. FIGS. 5 and 6 are top and sectional views showing reproducing apparatuses in accordance with the second embodiment, respectively.

As shown in FIGS. 5 and 6, the reproducing apparatus includes a first chamber 10, a second chamber 20, a third chamber 30, a transfer unit 40, a transfer gate 50, and a transfer gate 60. The transfer gate 50 sets a template before processing. The transfer gate 60 carries the template out after the processing. Each shutter is provided between the adjacent chambers, thereby allowing the template to be carried into or out of the respective chambers via the shutter.

The first chamber 10 is to remove the organic functional group of the release layer formed on the surface of the template. A stage is provided inside the first chamber. A template is set onto the stage in the first chamber 10 by the transfer arm from the transfer gate 50.

The first chamber 10 is provided with a light irradiation unit that oxidizes and decomposes the organic functional group to remove it. The light irradiation unit irradiates ultraviolet having a wavelength of 172 nm.

The second chamber 20 is to etch the Si—O bonding formed by the oxidation and decomposition; and includes a stage, a liquid supply unit 1, and a liquid supply unit 2. The template is transferred by a transfer arm from the first chamber 10 onto the stage in the second chamber 20.

The liquid supply unit 1 supplies chemical solution to the inside of the second chamber 20 for etching the Si oxide film. Examples of the supplied chemical solution include alkali solutions containing ammonia, choline, or sodium hydrate; and acid solutions containing hydrogen fluoride.

The liquid supply unit 2 supplies solution to be used for rinse that removes the chemical solution. Examples of the rinse solution include water and organic solvent.

The third chamber 30 is to form a release layer on the surface of the template; and includes a stage and a gas supply unit. The template is transferred by the transfer arm from the second chamber 20 to be set onto the stage in the third chamber 30.

The gas supply unit supplies a crude material for forming the release layer into the third chamber 30. A silane coupling agent denoted by Rn—Si—X4-n is used for the crude material to be supplied. Examples of R include an alkyl group and a fluoro group. Examples of X include an alkoxy group, an acetoxy group, and halogen atoms.

Figure 7:
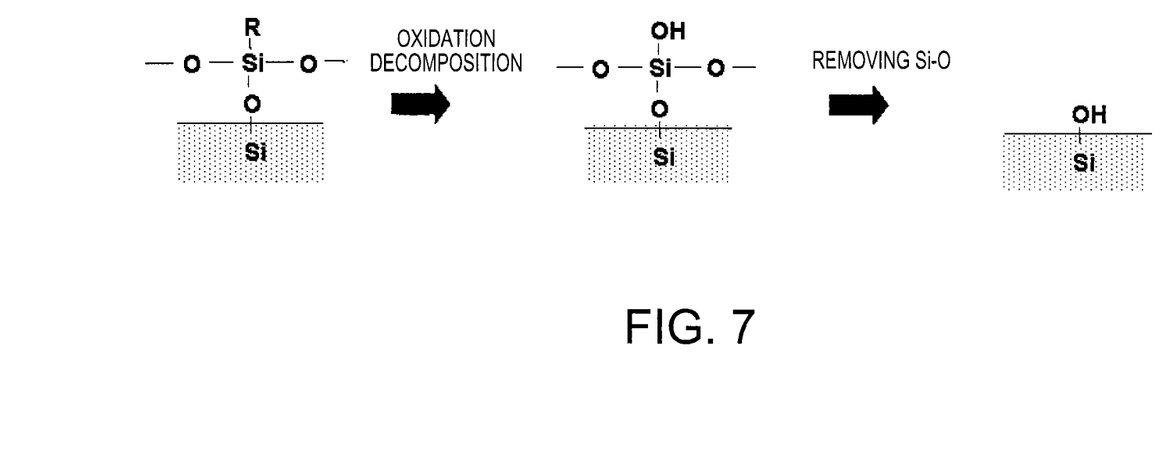
FIG. 7 is a view showing the respective steps for reproducing the template in accordance with the second embodiment.

Steps for reproducing a template using the reproducing apparatus will be described below. FIG. 7 is a view showing the respective steps for reproducing the template.

The template on which a release layer has been formed with a silane coupling agent is set in the transfer gate 50. The transfer arm transfers the template from the transfer gate 50 to the first chamber 10. The transferred template is held on the stage in the first chamber 10.

The light irradiation unit irradiates the template with light in the first chamber 10. As a result, oxygen reacts to the light to produce ozone and further produce oxygen radicals having higher oxidizing power. The ozone and the radicals oxidize and decompose the organic functional group of the silane coupling agent to clean the surface of the template.

After the light irradiation unit has stopped its light irradiation, the transfer arm transfers the template to the second chamber 20. The template transferred to the second chamber 20 is set onto the stage in the second chamber 20.

The liquid supply unit 1 supplies chemical solution to the inside of the second chamber 20 to etch the Si—O bonding. The chemical solution etches the Si—O bonding, which bonds directly to the template, of the silane coupling agent.

The liquid supply unit 2 supplies a rinse agent for removing the used chemical solution. Examples of the rinse agent include water and organic solvent. The rinse agent removes the chemical solution and etching residues left on the template to thereby clean the surface of the template. The cleaned surface of the silica template reacts with moisture in air, and is hydroxylated to form the silanol group thereon as shown in FIG. 7.

The transfer arm transfers the cleaned template to the third chamber 30. The template transferred to the third chamber 30 is set onto the stage in the third chamber.

In the third chamber 30, the gas supply unit supplies a silane coupling agent into the third chamber 30. The functional group X of the silane coupling agent denoted by $R_n$—Si—$X_{4-n}$ (n is an integer of $1 \leq n \leq 3$; X is one selected from the group consisting of an alkoxy group, an acetoxy group, and halogen atoms; R is an alkyl group) reacts hydrolytically with moisture in air to thereby form a silanol group. Furthermore, the silanol group and another silanol group on the surface of the silica template, both of which are adjacent to each other, undergo a dehydration-condensation reaction to form a surface layer.

The template reproduced by the above-described method is carried out of the transfer gate 60.

The above embodiment has exemplified that the template is cleaned by light irradiation in the first chamber 10. Alternatively, the template may be cleaned by chemical solution or plasma irradiation. In the above embodiment, the crude material for forming the surface layer is supplied as a gas. Alternatively, the crude material may be supplied as a liquid to be applied by spin coating, spray coating, or immersing. In addition, the formation of the surface layer may be conducted under reduced pressure.

The reproducing apparatus in accordance with the present embodiment enables it to prevent a change in the dimension of a template that is caused by repetitive reproduction. The repetitive reproduction has been conducted by oxidizing and decomposing the organic functional group of the release layer in the first chamber that is followed by removing the inorganic functional group of the release layer in the second chamber. In other words, the reproducing apparatus enables the continued use of a template, i.e., enhances the durability of a template.

The reproducing apparatus can provide the same results as those obtained in the first embodiment.

While certain embodiments of the invention have been described, these embodiments have been presented by way of example only, and are not intended to limit the scope of the inventions. Indeed, the novel elements and apparatuses described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method for reproducing a template, comprising:
    forming a release layer on a transfer surface of the template, the release layer including Si—O bondings and an organic functional group, both being bonded to the transfer surface, the transfer surface having a concavoconvex pattern to be transferred;

oxidizing and decomposing the organic functional group included in the release layer to remove the organic functional group and to expose the Si—O bondings;

removing the Si—O bondings by a chemical solution including at least one selected from of ammonia, choline, sodium hydrate and hydrogen fluoride; and forming the release layer by coupling a silane coupling agent with the transfer surface.

2. The method of claim 1, wherein
etching is conducted by 0.15 nm or more in the removing of the Si—O bondings.

3. The method of claim 1, wherein
the oxidizing and decomposing is conducted by treating with ultraviolet irradiation, plasma irradiation, or ozone treatment.

4. The method of claim 1, wherein
the release layer contains an inorganic functional group containing silicon atoms of the silane coupling agent, the silicon atoms being covalently bound with the transfer surface via oxygen atoms, and an organic functional group being adjacent to the silicon atoms.

5. The method of claim 1, wherein
the organic functional group contains an alkyl group or a fluoro group.

* * * * *